Patented May 26, 1942

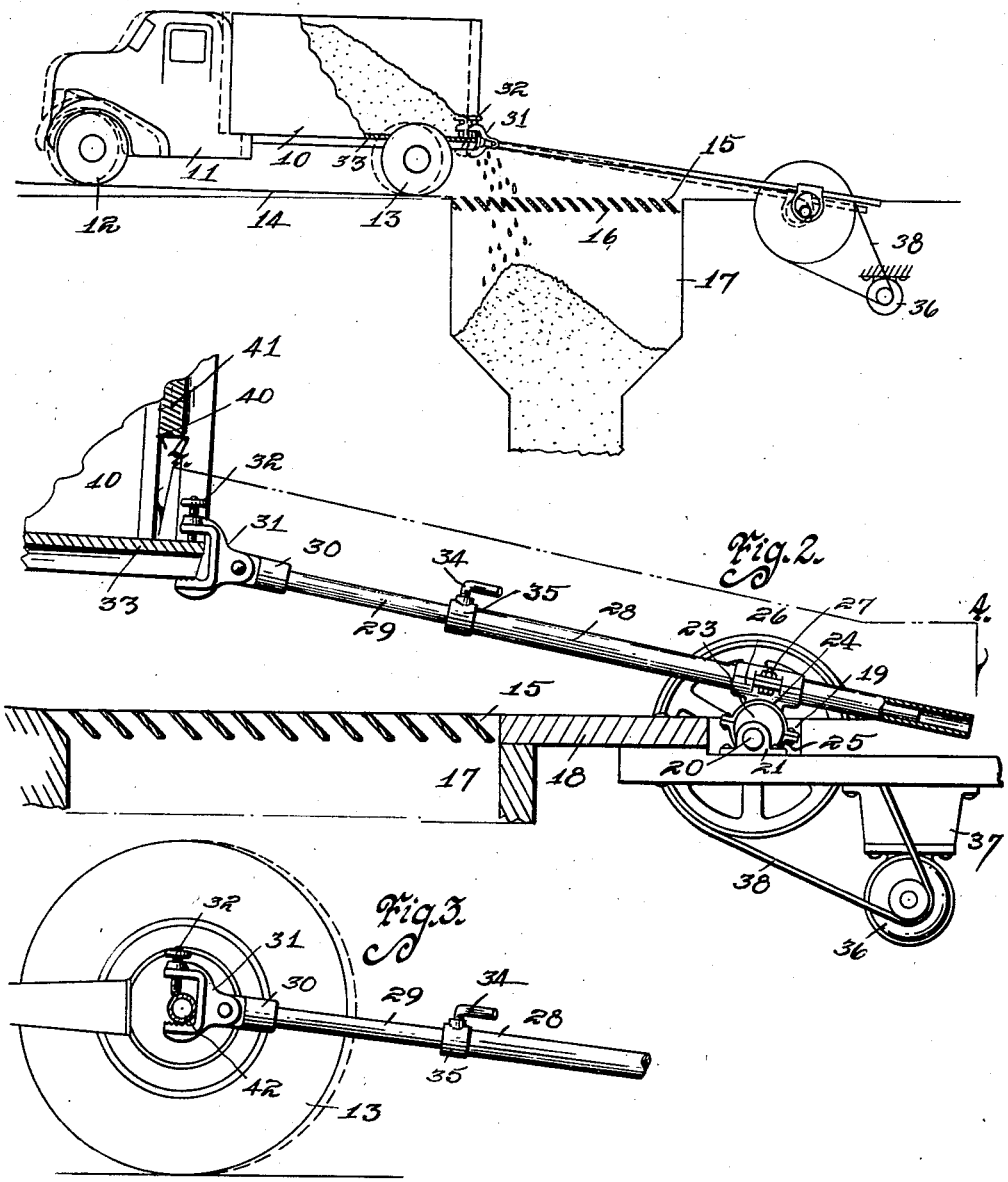

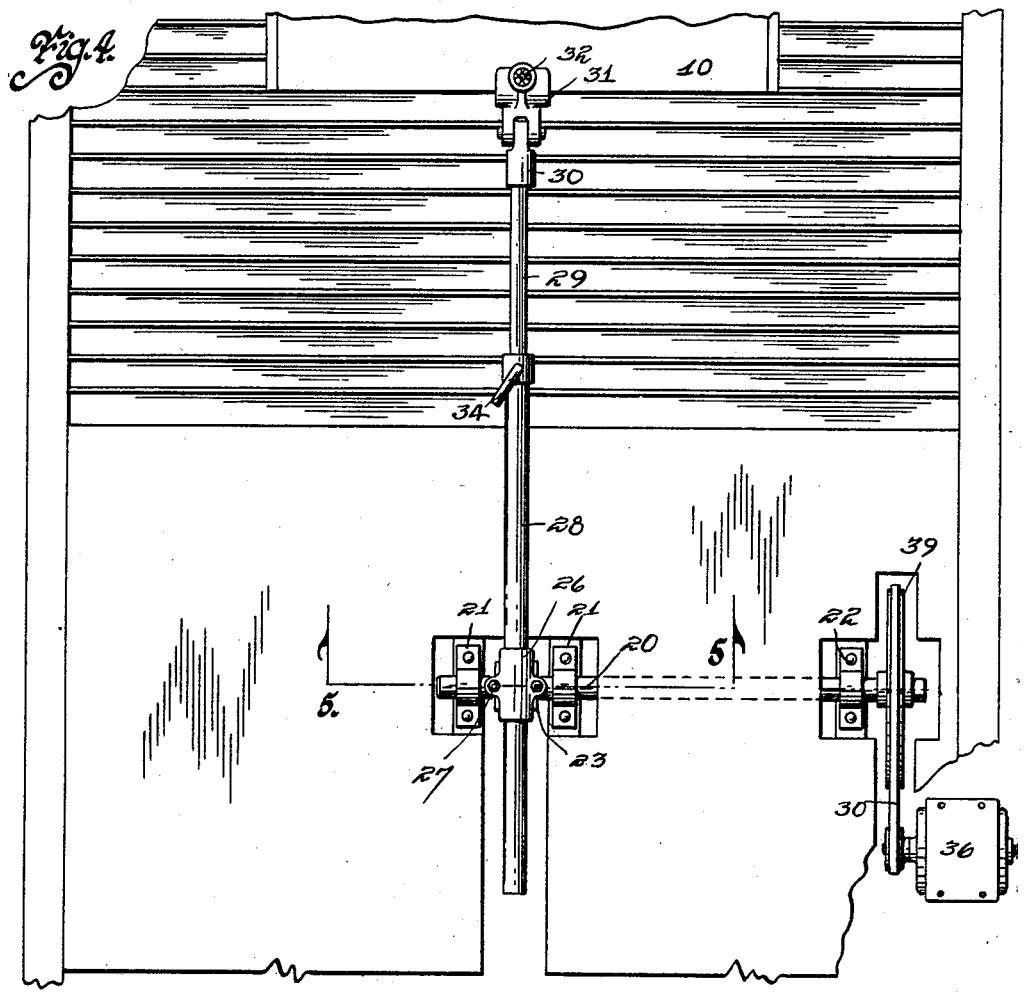
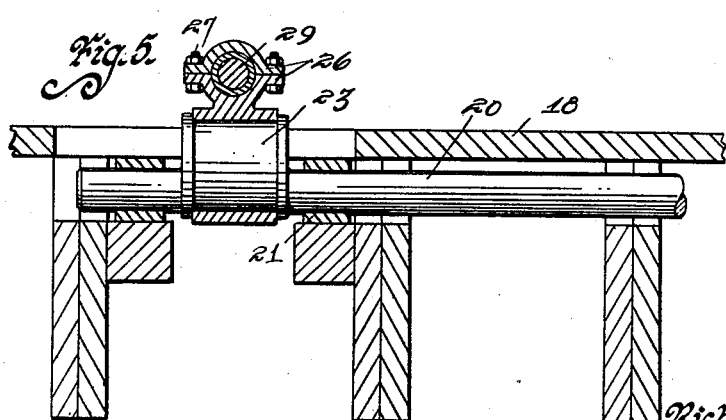

2,284,226

UNITED STATES PATENT OFFICE 2,284,226

WAGON DUMP DEVICE

Richard W. Oglesby, Des Moines, Iowa

Application February 23, 1940, Serial No. 320,457

4 Claims. (Cl. 214—44)

This invention relates to improvements in the art of dumping grain and the like from a vehicle, such as a wagon or a motor truck, to a grain pit located beneath the floor or platform on which the wagon or truck is supported. Numerous wagon dumps are now in common use, the wagon or truck to be dumped being moved to position with the rear end of the truck over and adjacent to the opening in the upper end of the grain pit. Means is then provided for elevating the front end of the truck so as to permit the grain within the body of the truck to fall from said body by gravity. In order to accomplish this it is necessary that one end of the truck be elevated six feet or more above the floor. Means has to be provided for trucks of various lengths. This inclination is very objectionable on account of the emptying of the oil in the crank case of the truck through the universal and transmission bearings; also emptying of the cups or pans in the crank case of the proper amount of oil, which oftentimes results in engine bearings being burned out after the truck is again operated. Furthermore, oftentimes the carburetor is wholly or partly drained, the gasoline and oil leaking from the engine on to the floor, causing a fire hazard.

It is, therefore, the object of my invention to provide improved means for causing the grain to flow from the body of the truck into the grain pit without having to elevate the front end of the truck to an amount in excess of an inclination to which the truck is designed to operate over hills in actual transportation.

A further object of my invention is to provide a very simple and inexpensive means for accomplishing the unloading operation whereby the device may be easily and quickly installed in connection with elevators or in use without any great amount of alteration in the driveways within the elevator.

More specifically, it is the object of my invention to provide simple means whereby the front end of the truck may be slightly elevated so as to cause the bottom of the body to be inclined downwardly and toward the grain pit, and in connection therewith, simple means which may be easily and quickly attached to the rear or open end of the body, wherein the said body may be oscillated longitudinally so as to cause a rapid shaking or oscillation of the body toward and from its open end, wherein material within the body will be set into motion in such a manner that the material will flow through its open end into the pit by gravity.

My invention consists in the construction, arrangement and combination of the various parts of the device, whereby the objects contemplated are attained, as hereinafter more fully set forth, pointed out in my claims, and illustrated in the accompanying drawings, in which:

Figure 1 is a diagrammatical elevation of a motor truck showing the manner in which my improved device is attached thereto and the manner in which grain is emptied from the vehicle body to the grain pit or bin.

Figure 2 is a detail enlarged sectional view of the rear end of the vehicle body of the top end of the grain pit and the lattice work supported therein, showing in side elevation my improved device for imparting oscillation to said body and the manner in which the oscillator is connected to the vehicle bed.

Figure 3 illustrates a modified manner of connecting the oscillator to the vehicle axis.

Figure 4 is a plan view of my improved device taken on the line 4—4 of Figure 2.

Figure 5 is a detail sectional view taken on the line 5—5 of Figure 4.

In the drawings I have used the reference numeral 10 to indicate the body of a vehicle or truck 11, and 12 the front wheels of said truck, and 13 the back wheels of the truck. The said wheels 12 and 13 are supported on an inclined platform 14, the forward end of the said platform being substantially six inches above the back end. At the back end of the platform 14 is provided an opening 15 in which is mounted the grate bars 16, and beneath the bars 16 is the usual grain pit 17.

Formed in the floor 18 is a slot 19 in which is rotatably mounted a shaft 20, said shaft being carried by suitable bearings 21 and 22. Mounted on the inner end of the shaft 20 and between the bearings 21 is an eccentric 23 which is fixed to the shaft. Rotatably mounted on said eccentric 23 is an eccentric block 24, which is preferably formed of two semi-circular pieces secured by bolts 25, providing means whereby the block is detachably mounted on the eccentric. The upper member of the block 24 is provided with a clamp device 26, which is also formed of two semi-circular members secured together by bolts 27. The members 26 are designed to receive and be adjustably clamped to a tubular shaft 28 in such a manner that the shaft may be adjusted longitudinally through the clamp device.

Slidably mounted in the member 28 is a rod 29 having secured to its inner end a head 30 to which is pivotally mounted a clamp device 31, said clamp device 31 including a set screw 32 wherein the clamp 31 may be detachably secured to the back edge of the floor 33 of the bed 10. A set screw 34 is mounted in a collar 35 attached to the inner end of the tubular shaft 28 to provide means for adjustably mounting the member 29 within the member 28.

As will be readily seen from Figures 1 and 2, the rear wheels 13 of the truck are supported near one edge of the pit opening 15 with the rear end of the bed 10 extending over said opening, the shaft 20 being mounted transversely across the floor 18 and on the opposite side of the opening 15 from which the wheels 13 are supported, with the push rods 28 and 29 extending across the bars 16. From this arrangement it will be seen that if the shaft 20 is rotated, then the eccentric 23 will be rotated, causing the push rods 28 and 29 to be moved longitudinally and the body 10 to be oscillated or reciprocated.

An electric motor 36 is mounted beneath the floor 18 by a suitable bracket 37. A belt 38 provides means for transmitting power from the motor to a belt wheel 39 carried by the outer end of the shaft 20, and thus provide mechanical means for rotating said shaft, thereby imparting short and rapid reciprocating movement to the wagon body. On account of said body being supported at a slightly inclined position with its front end slightly above its delivery end, grain will readily flow from the front end toward the delivery end and through a suitable opening 40 in the rear end of the body, said opening being formed by raising the end gate 41 any desired distance, thus providing means whereby grain will be rapidly delivered from the vehicle body to the grain pit with a minimum amount of apparatus and a comparatively small amount of power required to produce the oscillation.

In Figure 3 I have illustrated the clamp device 31 as being applied to the rear axle 42 of the vehicle instead of the back edge of the bed.

In the drawings I have illustrated a shaft and an eccentric for operating a push rod for producing the necessary oscillations to the back end of the wagon bed. However, it will be seen that various modifications might be substituted without departing from the general idea of supporting the front end of the wagon bed slightly higher than the back end and then oscillating the wagon body, or the bottom thereof, to set the material within the wagon body into motion. After being set into oscillatory motion this material will readily flow toward the delivery end.

In actual practice, all of the grain within the wagon body is moved towards the delivery end and discharged therefrom, eliminating the necessity of sweeping or using a shovel to finish the cleaning or delivery of the grain, as is usually required in the ordinary type of grain dump wherein the front end of the body is elevated to such an angle that the material will flow out without vibration, this sweeping and extra work being necessary with the ordinary grain dump due to the fact that it is not practical to elevate the truck to such a height that this material would flow out readily by gravity, as before stated, the elevation of the front end of the truck to a height of six feet being about the limit, and even then, very undesirable conditions exist.

One advantage of my improved device resides in the fact that it may be easily and quickly installed in the runway of any grain elevator now in common use, without the necessity of any great amount of remodelling. Some of these installations include a scale platform in the runway adjacent to one side of the grain pit opening. My device is readily adapted to this construction without any alteration of the scale equipment, simply by mounting the shaft 20 in the floor on the opposite side of the pit from the scale. The push rod is provided with means for increasing or shortening its length to adapt the device to be used with various sized grain pit openings, and also to be used in connection with trucks or vehicles of various lengths and shapes.

Another advantage of my device lies in the fact that it is equally adapted to trucks or vehicles of various lengths and sizes, and also may be used just as efficiently with a semi-trailer attached to the rear end of the vehicle. By mounting the shaft 20 below the upper face of the floor 18 it will readily be seen that when the push rod is disconnected from the rear end of the vehicle body, said push rod will lie substantially on the upper surface of the floor and across the grain pit so that a vehicle may be driven over the said push rod and over the said shaft with the wheels of the vehicle straddling the push rod. As soon as the vehicle has been located with the rear wheel adjacent to the edge of the grain pit the clamp device 30 is elevated into position and attached to the rear end of the body, after which the end gate 41 is elevated a slight distance to provide an opening of the desired height, and a portion of the grain in the rear end of the box will be automatically delivered to the grain pit by gravity. When the grain ceases to flow, then the shaft 20 is rotated and oscillations imparted to the body, causing the remainder of the material to flow to the delivery end.

I claim as my invention:

1. The combination of a platform having one end slightly higher than the other, a grain pit at the lower end of said platform, a transversely arranged shaft below said platform and adjacent to the other end of said grain pit, an eccentric on the inner end of said shaft, a push rod fixed to said eccentric, one end of said push rod extending across said grain pit, means for detachably connecting said end of the push rod to the discharge end of a vehicle with said discharge end over the grain pit, and means for rotating said shaft whereby the bottom of the bed of said vehicle will be oscillated toward and from its discharge end, and material within said body discharged into said pit.

2. The combination of an inclined platform, a grain pit near the lower end of said platform, a vehicle supported on said platform having a material-supporting body, the lower end of said vehicle body being provided with an opening through which material may be discharged therefrom into said pit, and mechanically operated means for imparting short oscillations to said body toward and from said open end, whereby material within the body will be set into motion and all of the material therein caused to flow toward and through said opening by gravity.

3. In a device of the class described, the combination of a support adapted to support a vehicle having a body for carrying mobile material and one end having an opening through which material within said body may be discharged, a pit for receiving said material, means for supporting the closed end of said body slightly above its open end, means for imparting oscillations to said body toward and from said open end, said means comprising a rotatably mounted shaft, an eccentric block carried by said shaft, a push rod adjustably mounted on said eccentric block to move longitudinally of itself and transversely of said shaft, an extension element adjustably mounted to the end of said push rod, a clamp device on the free end of the last said element adapted to be secured to the vehicle, and means for rotating said shaft whereby the vehicle will be oscillated toward and from its open end to cause material within said body to flow therefrom through said opening by gravity.

4. The combination of an inclined platform, a grain pit near the lower end of said platform, a vehicle carried on said platform, having a material-supporting body, the lower end of said vehicle body being provided with an opening through which material may be discharged therefrom into said pit, a mechanically operated means for imparting short oscillations to said body toward and from said open end, said means comprising a rotatably mounted shaft, an eccentric block carried by said shaft, a push rod adjustably mounted on said eccentric block to move longitudinally of itself and transversely of said shaft, an extension element adjustably mounted to the end of said push rod, a clamp device on the free end of the last said element adapted to be secured to the vehicle, and means for rotating said shaft whereby the vehicle will be oscillated towards and from its open end to cause material within said body to flow therefrom through said opening by gravity.

RICHARD W. OGLESBY.